Dec. 4, 1934.   E. LEEBERG   1,982,749
TURF FORK
Original Filed April 27, 1933
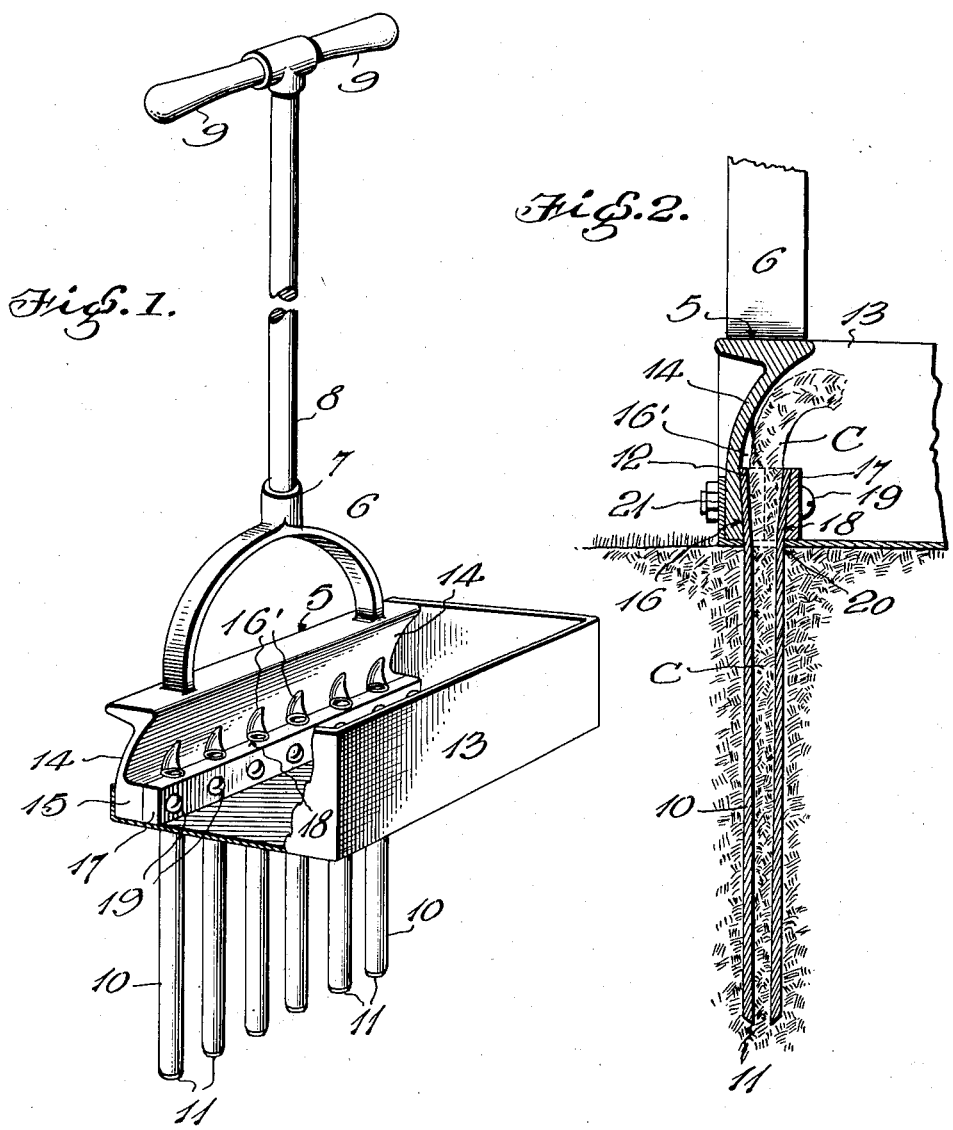
Witness
H. Woodard
Inventor
Edward Leeberg
By H. B. Willson & Co.
Attorneys.

Patented Dec. 4, 1934

1,982,749

UNITED STATES PATENT OFFICE 1,982,749

TURF FORK

Edward Leeberg, Roselle, N. J.

Application April 27, 1933, Serial No. 668,271
Renewed September 24, 1934

7 Claims. (Cl. 55—18)

The invention relates to improvements in forks for use in formation of a myriad of openings in turf, allowing the entrance of air, top-dressing, fertilizer and water and allowing grass roots more room for expansion and deeper growing, as well as permitting top soil to mingle with stiff hard soil below.

More specifically, the invention relates to a turf fork having tubular tines through which cores of turf are discharged upon repeated forcing of said tines into the earth, and the invention aims primarily to provide a new and improved fork of this character which will exert no packing effect upon the earth around the openings formed by removal of the cores, allowing these openings to more advantageously carry out their intended function.

A further object of the invention is to provide a fork provided with novel means for laterally deflecting all of the cores discharged from the tines.

A still further aim is the provision of a fork embodying a receptacle which receives the discharged cores instead of allowing them to drop upon the ground.

Yet another aim is the provision of an efficient and durable fork, the tines of which may be readily replaced when badly worn.

While the device is intended primarily to be constructed in the form of an actual fork, it may be used as an effective weeder if constructed with only one tubular tine, for the weed roots may be removed with the core of earth by simply forcing the tine into the ground around the weed center.

Fig. 1 of the accompanying drawing is a perspective view showing the improved turf fork, part of the core-receiving receptacle being broken away.

Fig. 2 is a vertical sectional view with a part of the receptacle broken away.

A preferred construction has been shown and will be specifically described, with the understanding however, that within the scope of the invention as claimed, variations may be made.

The device embodies a horizontally elongated handle-carried head 5 preferably having an integral arched portion 6 carrying a socket 7 in which the lower end of the handle 8 is secured, the upper end of said handle being provided with hand grips 9. The head 5 carries a plurality of tubular tines 10, and to force said tines into the earth, the operator may exert downward pressure on said head, with one foot. The tines 10 are of tubular form throughout their lengths and are open at both their upper and lower ends, said lower ends being provided with cutting edges 11. The upper ends of the tines are preferably flared as denoted at 12 to facilitate anchorage to the head 5 in a manner hereinafter described. From the flared portion 12 to its lower end, each tine 10 is preferably of uniform external diameter, but the interior of the tine may, if desired, be reamed to gradually increase the internal diameter of the tine from its lower to its upper end, thereby facilitating the discharge of the turf cores C through the open upper end upon repeated forcing of the fork into the ground.

I preferably provide deflecting means at the open upper ends of the tines 10, to laterally deflect the cores C as they are discharged, and I also prefer to provide the head 5 with a catch receptacle 13 to receive said cores instead of allowing them to fall onto the turf. When the receptacle becomes filled, it may be easily emptied by proper manipulation of the fork. The aforementioned deflecting means or mold board is preferably formed by part of the head 5 as described below.

The main body of the head 5 is preferably of substantially the shape of the figure 7 in transverse section, the substantially vertical web portion of said body being denoted at 14. The lower edge portion of this web 14 is laterally thickened to form a tine supporting bar as shown at 15, and said thickened portion is provided with spaced grooves 16 which receive half the circumference of the flared tine ends 12. A clamping bar 17, opposed to the thickened web portion 15, is grooved at 18 to receive the remainders of the flared tine ends 12, and clamping bolts 19 are employed to secure said bar 17 to the web 14. This web is inclined laterally over the open upper ends of the tines 10 for the purpose of laterally deflecting the cores C as they are discharged. The grooves 16 preferably extend somewhat above the thickened web portion 15 and merge gradually into the surface of the web as shown at 16', providing for smooth unobstructed core-deflecting surfaces.

The receptacle 13 may well be of rectangular form, with openings 20 in its bottom through which the tines 10 pass, one side wall 21 of said receptacle (which may be lower than the others) being secured against the web 14 by the bolts 19. When these bolts are tightened, they effectively secure the receptacle 13 and they also tightly clamp the flared ends 12 of the tines 10. The flare of these tine ends prevents them from pulling downwardly from engagement with the head 5, and the inclination of the web 14 prevents said tines from sliding upwardly.

It will be seen from the foregoing that I have provided a novel turf fork which will leave the area upon which it is used, with numerous clean cut holes, the earth around these holes being free from packing. These holes therefore afford ample room for the entrance of air and to receive fertilizer, top-dressing and water. The grass roots are given more room to expand and are allowed to grow more deeply, and hard sub-soil may to some extent merge with loose top-dressing. Water reaches the grass roots quickly and leaves moist earth for the roots to feed upon.

While the details disclosed may well be followed, attention is again invited to the fact that variations may be made within the scope of the invention as claimed. Further attention is directed to the possibility of constructing the contrivance for use as a weeder, and wherever a weed and its root are removed, the grass roots which may have been more or less crowded out by the weed roots will derive benefit from the opening left in the ground. The specific construction shown may be used for weeding, simply by removing all but one of the tines.

I claim:—

1. A turf fork comprising a handle-carried head having a horizontally elongated substantially vertical web, and a plurality of core-removing tines of tubular form throughout their lengths and having open upper and lower ends, said upper ends being secured at one side of said web along the lower portion of the latter, said web being laterally inclined over the open upper ends of said tines to laterally deflect the earth cores discharged through said upper tine ends.

2. A turf fork comprising a handle-carried head having a horizontally elongated substantially vertical web, the lower edge portion of said web being laterally thickened on one side and having vertical grooves in said thickened portion, a plurality of turf-removing tines tubular throughout their lengths and open at their upper and lower ends, said upper ends lying in said grooves, a clamping bar opposed to said thickened web portion and grooved to engage the tines, and clamping bolts securing said bar and thickened web portion together to clamp the tines.

3. A structure as specified in claim 2; said web being laterally inclined over said upper ends of the tines to laterally deflect the turf cores discharged therethrough.

4. A structure as specified in claim 2; together with a core receptacle at one side of said head and secured thereto by said clamping bolts to receive the turf cores discharged from said tines.

5. A turf fork, comprising a head provided with a handle member, said head having a tine supporting bar along its lower marginal portion, tubular tines affixed to said supporting bar, the free lower ends of said tines having annular cutting edges, and said head including an upwardly and outwardly curved mold-board extending above the upper discharge ends of said tines.

6. A turf fork, comprising a head provided with a handle member, said head having a tine supporting bar along its lower marginal portion, tubular tines affixed to said supporting bar, said head including an upwardly and outwardly curved mold-board overhanging the upper discharge ends of said tubular tines, and a catch-receptacle carried by said head forwardly of said mold-board.

7. A turf treating device comprising a turf core receptacle provided with an inherently rigid tine-attaching portion formed with a plurality of tine-receiving openings, a plurality of tubular core cutting tines secured in said openings of said rigid tine attaching portion of said receptacle, and an operating handle operatively connected with said receptacle.

EDWARD LEEBERG.